United States Patent [19]

Inada et al.

[11] 4,307,752
[45] Dec. 29, 1981

[54] SOLENOID ACTUATED VALVE DEVICE

[75] Inventors: Masami Inada, Kariya; Takeharu Ohumi; Kenji Hashimoto, both of Toyota, all of Japan

[73] Assignee: Aisin Seiki Kabushiki Kaisha, Kariya, Japan

[21] Appl. No.: 105,438

[22] Filed: Dec. 19, 1979

[30] Foreign Application Priority Data

Dec. 26, 1978 [JP] Japan .................................. 53-164868
Dec. 27, 1978 [JP] Japan .................................. 53-180292

[51] Int. Cl.³ ........................ F16K 31/08; F16K 11/07
[52] U.S. Cl. ................................. 137/625.48; 251/65; 251/139
[58] Field of Search .................. 137/625.65, 625.48; 251/65, 129, 139

[56] References Cited

U.S. PATENT DOCUMENTS

| | | | |
|---|---|---|---|
| 2,637,343 | 5/1953 | Matthews | 251/65 |
| 3,001,549 | 9/1961 | Nelson et al. | 251/129 X |
| 3,850,196 | 11/1974 | Fales | 251/129 X |
| 4,193,421 | 3/1980 | Sakakibara et al. | 251/129 X |
| 4,216,938 | 8/1978 | Inada et al. | 251/65 |

Primary Examiner—Arnold Rosenthal
Attorney, Agent, or Firm—Sughrue, Mion, Zinn, Macpeak & Seas

[57] ABSTRACT

The solenoid actuated valve device is comprised of a housing of magnetic material having a radially disposed inlet and at least one axially disposed outlet in communication with the interior of a hollow magnetic core disposed within the body. An annular bobbin having a solenoid coil wound thereon is slidably mounted on the core and is normally biased into a position closing at least one elongated radially extending opening through the core. Permanent magnets are secured to the interior of the body in such a manner that the lines of flux intersect the solenoid coil at right angles thereto. Two springs normally bias the bobbin to the closed position and extend between one end of the bobbin and a spring support member disposed adjacent one end of the body. Each spring is connected to one end of the coil and to a respective electrical terminal for supplying electric current to the solenoid coil and the position of the spring support is adjustable relative to the end of the housing by means of a screw threadably extending through the end of the housing into engagement with the spring holder to vary the spring force acting on the bobbin. The connection between the two springs and the ends of the solenoid coil are insulated from the bobbin to prevent a short circuit which would deprive the solenoid coil of electric current. The connections between the two springs and the terminals are also encapsulated with insulating material subsequent to the adjustment of the spring holder relative to the end of the housing.

4 Claims, 2 Drawing Figures

SOLENOID ACTUATED VALVE DEVICE

BACKGROUND OF THE INVENTION

1. Field of the Invention

The present invention relates to solenoid actuated valve devices and more particularly to solenoid actuated valve devices for controlling the flow of fluid in proportion to the electric current supplied to the solenoid.

2. Prior Art

A conventional solenoid actuated valve device comprises a linear motor of the movable coil type and a valve means. The linear motor includes a core, a bobbin slidably mounted on the core, a solenoid coil wound on the bobbin, permanent magnets with the magnetic flux of each intersecting the windings of the solenoid coil at right angles and a yoke or body forming a magnetic circuit with the core. The valve means in general include a sliding valve member which slides with the bobbin on the core in response to the electric current flowing through the solenoid coil to thereby proportionally control openings formed in the core between an inlet port and an outlet port. The sliding valve member is always biased by means of a pair of springs in a direction so that the sliding valve will close the openings to thereby interrupt the fluid communication between the inlet and outlet ports.

In such prior solenoid actuated valves, one end of each of the springs is connected to the solenoid coil and the other end of each spring to a terminal which is electrically connected to a suitable power supply. Thus, the springs are adapted to function as conductive members. Since the said other ends of the springs have to be connected to terminals, the said other ends of the springs are securely supported in the body of the solenoid actuated valve devices thereby making it impossible to adjust the biasing forces of the springs which bias the sliding valve with the bobbin. Thus, the timing by which the sliding valve controls the openings cannot be adjusted and the desired flow of fluid cannot be properly controlled.

Additionally, in such prior devices, the said one ends of the springs are connected to opposite ends of the solenoid coil through the bobbin. Since the bobbin is normally made of metal, the connecting portions thereof between the springs and the coil are apt to short-circuit the coil so that electric current cannot flow through the coil thereby preventing the operation of the valve.

SUMMARY OF THE INVENTION

It is an object of the present invention therefore, to provide a new and improved solenoid actuated valve device which obviates the above-mentioned drawbacks of prior art devices.

It is another object of the present invention to provide a new and improved solenoid actuated valve device which controls the desired flow of fluid in proportion to the electric current supplied to the solenoid.

It is still another object of the present invention to provide a solenoid actuated valve device for electrically controlling the flow of fluid, comprising a body having an inlet port and at least one outlet port, a hollow core axially positioned within said body and having at least one opening which provides fluid communication between said inlet and said at least one outlet port, a bobbin slidably mounted on said core for controlling the effective area of said opening, a solenoid coil wound on said bobbin, permanent magnet means mounted in said body so that the magnetic flux thereof intersects the winding of said solenoid coil at right angles, magnetic means forming a magnetic circuit including said permanent magnet means in cooperation with said core so that a force is generated to cause said bobbin to slide axially of said core when said coil receives an electric current, a spring holder in said body in spaced relation to said bobbin, a pair of spring means extending between said spring holder and said bobbin for biasing said bobbin to a position wherein said opening is closed, one end of each of said pair of spring means being connected to the opposite ends of said solenoid coil, respectively, and the other ends of said spring means extending through said spring holder and being connected to corresponding terminals, respectively, and adjusting means for adjusting the position of said spring holder to thereby adjust the biasing forces of said spring means.

The foregoing and other objects, features and advantages of the invention will be apparent from the following more particular description of preferred embodiments of the invention as illustrated in the accompanying drawings.

DETAILED DESCRIPTION OF THE INVENTION

Figure 1:
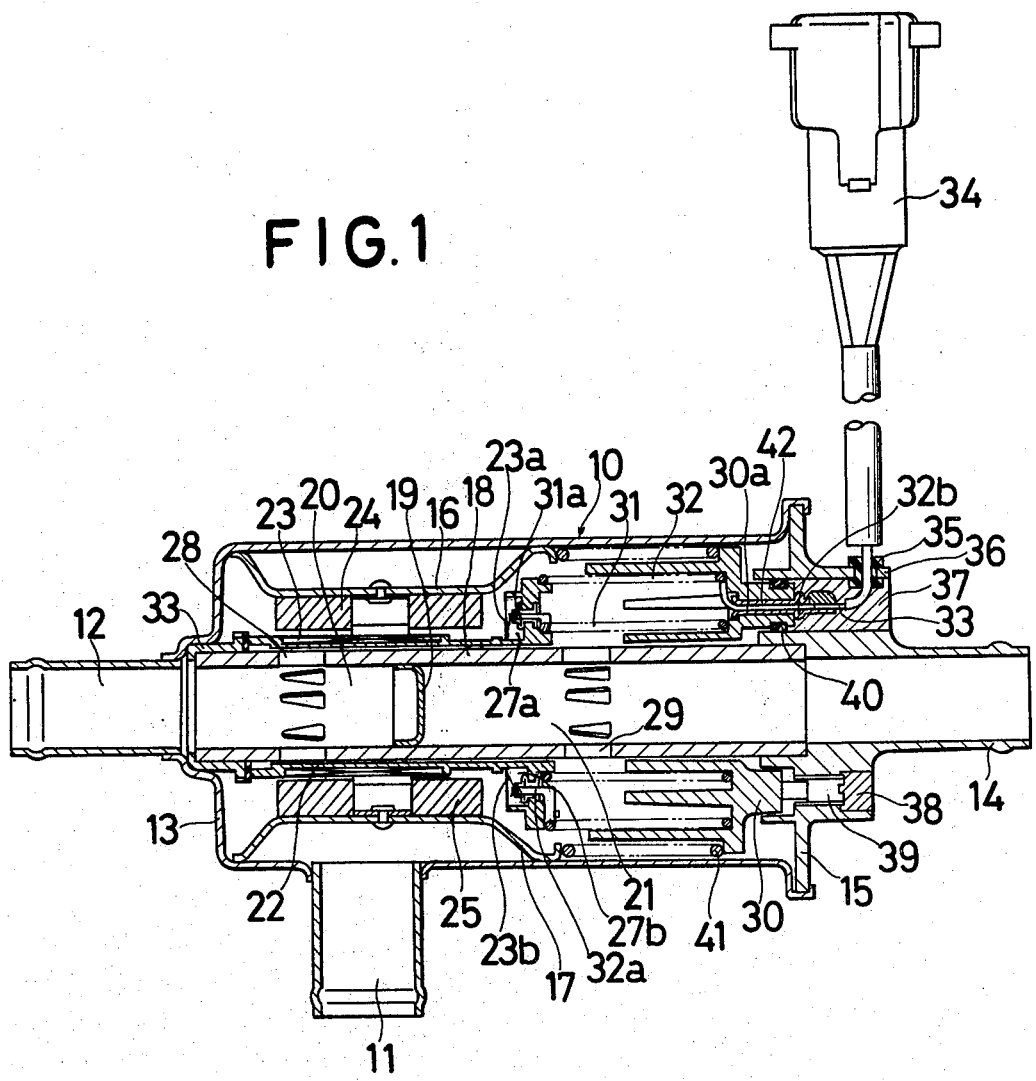
FIG. 1 is a sectional view of a solenoid actuated valve device according to the present invention.

In FIG. 1, the solenoid actuated valve device 10 is comprised of a body 13 of magnetic material having an inlet port 11 and a first outlet port 12 and a cover member 15 of magnetic material having a second outlet port 14. The body 13 and the cover member 15 are sealing secured to each other. A core 18 is axially positioned within the body 13 and is made of a suitable magnetic material such as steel. The central hollow portion of the core 18 is divided into first and second chambers 20 and 21 by means of an intercepting wall 19. The first chamber 20 is always in communication with the first outlet port 12 while the second chamber 21 is always in communication with the second outlet port 14. A bobbin 22 is slidably mounted on the core 18 and is made of a suitable non-magnetic material such as synthetic resin. A solenoid coil 23 which generates a magnetic force is wound on the bobbin 22. A pair of permanent magnets 24 and 25 are supported by means of supporting members 16 and 17 of magnetic material secured to the body 13 and are so positioned that the magnetic flux of each of the magnetics 24 and 25 intersects the windings of the coil 23 at right angles. Thus, a magnetic circuit for magnets 24 and 25 is formed by means of core 18, supporting members 16, 17, body 13 and cover 15. In this manner, a linear motor of the movable coil type is provided.

The core 18 has a first plurality of openings or passages 28 of an axially elongated configuration to provide fluid communication between the inlet port 11 and the first chamber 20 and a second plurality of openings or passages 29 of axially elongated configuration to provide fluid communication between the inlet port 11 and the second chamber 21. The bobbin 20 is adapted to axially move on the core 18 so as to cover the first and second openings 28 and 29 in proportion to the electric current transmitted to the solenoid coil 23. Thus, the effective areas of the openings 28 and 29 are proportionally controlled in response to the sliding movement of the bobbin 22. The first openings 28 are proportionally controlled to be opened in response to an increase in current whereas the second openings 29 are proportionally controlled to be closed in response to an increase in current.

A spring holder 30 is arranged between the core 18 and the body 13 and a pair of springs 31 and 32 are inserted within the holder 30; the diameters of springs 31 and 32 being different. The springs 31 and 32 bias the bobbin 22 to the left as viewed in FIG. 1 so that the bobbin 22 is normally maintained in its illustrated or original position with the left end of the bobbin 22 in contact with a stopper 33 which is secured to the body 13. Thus, the first openings 28 are normally closed and the second openings 29 are normally open. The ends 31a and 32a of the springs 31 and 32 are connected to the ends 23a and 23b of coil 23 extending through insulating material 27a and 27b of resin or the like. The other end 32b of spring 32 extends through a hole 30a in the holder 30 and is connected to terminal 33 by means of solder or the like and is located within an eyelet 42. A similar arrangement is provided for connecting the other end of spring 31 but is not visible in FIG. 1. Both of the terminals are connected to a power supply by means of a connector 34 and are positioned within a recessed portion 36 of the cover 15 by means of a supporting member 35 of insulating material. The terminals are further supported by means of an insulating resin 37 which encapsulates the connection between the terminals and the springs.

An adjusting screw member 39 is threaded through the cover 15 and sealed by means of a seal member 38 of silicone rubber material. An inner end of the screw member 39 is disposed in contact with the holder 30 so that the position of the holder 30 can be adjusted in response to the threading movement of the screw member 39. This results in an adjustment of the biasing forces of the springs 31 and 32. O-ring seal 40 is arranged between the holder 30 and the end cover 15. Inserted between the supporting members 16, 17 and the holder 30 is a return spring 41 which assures that the holder 30 will be maintained in contact with the screw 39. However, it is noted that the arrangement of the return spring 41 is not always necessary if the biasing forces of the springs 31 and 32 are properly set. The biasing force of the spring 41 is also adjusted by means of the screw member 39.

The method of adjusting the biasing forces of the springs 31, 32 and 41 is as follows. First, the ends of springs 31 and 32 are connected to the terminals by means of solder or the like and the cover 15 and the body 13 are secured together. Under these conditions with the terminals connected to the connector 34 the screw member 39 is threaded through the cover before the silicone seal member 38 is provided. The screw member 39 is then turned in one direction or the other in the cover 15 to properly adjust the biasing forces of the spring 31 and 32 through the movement of the holder 30. The seal 38 is then formed over the head of the screw 39. The supporting member 35 is then positioned within the recessed portion 36 and the insulating resin 37 is applied. Thus, the biasing forces of the spring 31, 32 and 41 are properly adjusted and the device is properly sealed.

In operation, under the normal or non-operating condition where no electric current flows through the solenoid coil 23, the bobbin 22 is maintained in its illustrated or original position by means of the springs 31 and 32. Thus, the first openings 28 are closed and the second openings 29 are opened. The fluid communication between the inlet port 11 and the first outlet port 12 is now interrupted while the fluid communication between the inlet port 11 and the second outlet port 14 is now open. Under these conditions, the magnetic flux of the magnets 24 and 25 form a closed loop through core 18, supporting members 16, 17, body 13 and cover 15 and part of the magnetic flux passes through the solenoid coil 23.

When the electric current flows through the coil 23 a force in the right-hand direction as viewed in FIG. 1 is generated in proportion to the electric current as is well known from Fleming's Left-Hand law. Accordingly, since the bobbin 22 moves to the right in proportion to the electric current against the biasing forces of the springs 31 and 32, the first openings 28 are proportionally opened and the second openings 29 are proportionally closed. More particularly, the openings are formed as elongated holes in the axial direction and thus, the effective areas of the openings 28 are increased and the effective areas of the openings 29 are decreased in proportion to the rightward movement of the bobbin 22. Thus, the bobbin 22 acts as a valve member.

The inlet port 11 may be connected to an air pump, the first outlet port 12 may be connected to an exhaust manifold and the second outlet port 14 may be connected to an air cleaner. Furthermore, the solenoid coil 23 may receive the electric current from a computer which is adapted to deliver an electrical output signal in response to engine temperature, engine vacuum, engine revolution and the like. Thus, the above-mentioned solenoid actuated valve device may be applied within a well-known secondary air injection system which is one of the various emmission control systems for internal combustion engines.

Figure 2:
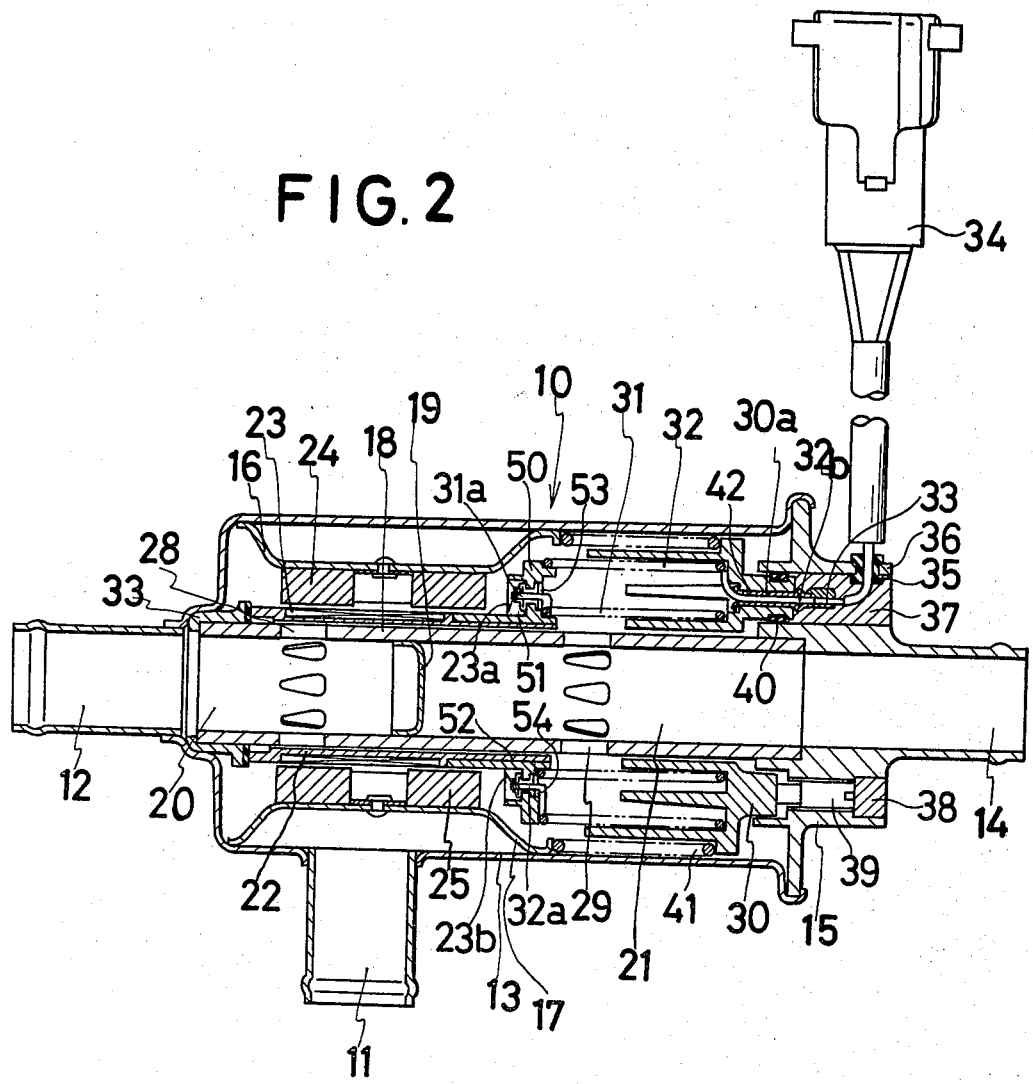
FIG. 2 is a view similar to FIG. 1 but showing a modification of the present invention.

In FIG. 2, a modification of the present invention is shown with the parts thereof identical to those of the previous embodiment designated by the same numerals. A detailed description of these parts can therefore be omitted.

In the modification of FIG. 2, the bobbin 22 is made of a magnetic material such as steel. The bobbin 22 has at the right end thereof an insulating member 50 of resin. The ends of the springs 31 and 32 extend to the coil 23 through the insulating member 50 and are connected to ends 23a and 23b of the coil 23 by means of solder or the like, which connections are encased in insulating resin portions 51 and 52. Thus, the connecting portions between the ends 23a and 23b of the coil 23 and ends 31a and 32a of the springs 31 and 32 are carefully protected by means of insulating members 50, 51 and 52. Therefore, the ends 31a and 32a of the springs 31 and 32 which are connected to the positive and negative poles of the power supply source, respectively, are completely prevented from contacting and thus there is substantially no possibility of the electric current not flowing through the coil when the flow of electric current is desired. The above connecting portions may extend through eyelets 53 and 54 which are secured to the insulating member 50.

The operation of this embodiment is substantially the same as that of the previous embodiment and, therefore, a detailed explanation will be omitted.

While the invention has been particularly shown and described with reference to preferred embodiments thereof, it will be understood by those in the art that various changes in form and detail may be made therein without departing from the spirit and scope of the invention.

What is claimed is:

1. A solenoid actuated valve device for electrically controlling the flow of fluid, comprising:

a body having an inlet port and at least one outlet port, a hollow core axially positioned within said body and having at least one opening which provides fluid communication between said inlet and said at least one outlet port, a bobbin slidably mounted on said core for controlling the effective area of opening, a solenoid coil wound on said bobbin, permanent magnet means mounted in said body so that the magnetic flux thereof intersects the winding of said solenoid coil at right angles, magnetic means forming a magnetic circuit including said permanent magnet means in cooperation with said core so that a force is generated to cause said bobbin to slide axially of said core when said coil receives an electric current, a spring holder in said body in spaced relation to said bobbin, a pair of spring means extending between said spring holder and said bobbin for biasing said bobbin to a position wherein said opening is closed, one end of each of said pair of spring means being connected to the opposite ends of said solenoid coil, respectively, and the other ends of said spring means extending through said spring holder and being connected to corresponding terminals, respectively, and adjusting means for adjusting the position of said spring holder to thereby adjust the biasing forces of said spring means, said adjusting means being comprised of a screw member threaded through said body in contact with said spring holder.

2. A solenoid actuated valve device for electrically controlling the flow of fluid, comprising:

a body having an inlet port and at least one outlet port, a hollow core axially positioned within said body and having at least one opening which provides fluid communication between said inlet and said at least one outlet port, a bobbin of magnetic material slidably mounted on said core for controlling the effective area of opening, a solenoid coil wound on said bobbin, permanent magnet means mounted in said body so that the magnetic flux thereof intersects the winding of said solenoid coil at right angles, magnetic means forming a magnetic circuit including said permanent magnet means in cooperation with said core so that a force is generated to cause said bobbin to slide axially of said core when said coil receives an electric current, a spring holder in said body in spaced relation to said bobbin, a pair of spring means extending between said spring holder and said bobbin for biasing said bobbin to a position wherein said opening is closed, one end of each of said pair of spring means being connected to the opposite ends of said solenoid coil, respectively, and the other ends of said spring means extending through said spring holder and being connected to corresponding terminals, respectively, adjusting means for adjusting the position of said spring holder to thereby adjust the biasing forces of said spring means, and an insulating member secured to one end of said bobbin, with the connection between said ends of said coil and said one ends of said springs being protected by said insulating member.

3. A solenoid actuated valve device for electrically controlling the flow of fluid, comprising:

a body having an inlet port and at least one outlet port, a hollow core axially positioned within said body and having at least one opening which provides fluid communication between said inlet and said at least one outlet port, a bobbin slidably mounted on said core for controlling the effective area of opening, a solenoid coil wound on said bobbin, permanent magnet means mounted in said body so that the magnetic flux thereof intersects the winding of said solenoid coil at right angles, magnetic means forming a magnetic circuit including said permanent magnet means in cooperation with said core so that a force is generated to cause said bobbin to slide axially of said core when said coil receives an electric current, a spring holder in said body in spaced relation to said bobbin, a pair of spring means extending between said spring holder and said bobbin for biasing said bobbin to a position wherein said opening is closed, one end of each of said pair of spring means being connected to the opposite ends of said solenoid coil, respectively, and the other ends of said spring means extending through said spring holder and being connected to corresponding terminals, respectively, adjusting means for adjusting the position of said spring holder to thereby adjust the biasing forces of said spring means, an additional opening in said hollow core axially spaced from said first mentioned opening, wall means intermediate said openings dividing the hollow core into two chambers and a second outlet port; said at least one outlet port being connected to one of said chambers and said second outlet port being connected to the other of said chambers.

4. A solenoid actuated valve device as set forth in claim 3, wherein said additional opening is disposed between said spring holder and said bobbin when said bobbin completely closes said first-mentioned opening whereby upon movement of said bobbin in response to electrical current through said coil said bobbin will close said additional opening and uncover said first-mentioned opening.

* * * * *